(12) United States Patent
Goggin et al.

(10) Patent No.: US 10,269,379 B1
(45) Date of Patent: Apr. 23, 2019

(54) HEAT-ASSISTED MAGNETIC RECORDING HEAD HAVING WAVEGUIDE WITH OUTER PSEUDO-SLAB THAT CONFINES STRAY LIGHT

(71) Applicant: Seagate Technology LLC, Cupertino, CA (US)

(72) Inventors: Aidan Dominic Goggin, Donegal (IE); Reyad Mehfuz, Derry (GB); Kelly Elizabeth Callan, Derry (GB); John Bernard McGurk, Derry (GB)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/874,353

(22) Filed: Jan. 18, 2018

Related U.S. Application Data

(60) Provisional application No. 62/462,478, filed on Feb. 23, 2017.

(51) Int. Cl.
| | | |
|---|---|---|
| *G11B 11/00* | (2006.01) | |
| *G11B 5/012* | (2006.01) | |
| *G11B 13/08* | (2006.01) | |
| *G11B 5/00* | (2006.01) | |
| *G11B 5/60* | (2006.01) | |

(52) U.S. Cl.
CPC ............ *G11B 5/012* (2013.01); *G11B 13/08* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,098,547 B2 * | 1/2012 | Komura ............... | B82Y 20/00 360/59 |
| 8,170,389 B1 * | 5/2012 | Komura ............... | B82Y 20/00 360/59 |
| 8,358,565 B2 | 1/2013 | Komura et al. | |
| 9,001,628 B1 | 4/2015 | Shi et al. | |
| 9,466,320 B1 | 10/2016 | Staffaroni et al. | |
| 9,786,314 B1 * | 10/2017 | Peng .................... | G11B 13/08 |
| 9,934,801 B1 * | 4/2018 | Wessel ................ | G11B 5/4866 |
| 9,960,570 B1 * | 5/2018 | Goggin ................ | H01S 5/14 |
| 2011/0103201 A1 * | 5/2011 | Peng .................... | G11B 5/314 369/13.24 |
| 2012/0072931 A1 * | 3/2012 | Imada .................. | G11B 5/314 720/672 |
| 2012/0092971 A1 | 4/2012 | Schreck et al. | |

(Continued)

*Primary Examiner* — Tan X Dinh
(74) *Attorney, Agent, or Firm* — Hollingsworth Davis, LLC

(57) ABSTRACT

A recording head has a waveguide core with an input facet at an input surface. The waveguide core extends to a near-field transducer at a media-facing surface of the recording head. First and second cladding regions are co-planar with and on either cross-track side of the waveguide core. First and second pseudo-slab regions are co-planar with and on outer cross-track sides of the respective first and second cladding regions. The first and second pseudo-slab regions have an index of refraction higher than that of the first and second cladding regions. The first and second pseudo-slab regions confine and channel stray light away from the near-field transducer.

20 Claims, 14 Drawing Sheets

(56) References Cited

U.S. PATENT DOCUMENTS

| | | | | |
|---|---|---|---|---|
| 2013/0108212 A1* | 5/2013 | Peng | ............... | G02B 6/4215 385/15 |
| 2014/0140091 A1* | 5/2014 | Vasylyev | ............ | G02B 6/001 362/606 |
| 2016/0247525 A1* | 8/2016 | Lee | ............ | G11B 5/314 |
| 2016/0293189 A1* | 10/2016 | Yang | ............ | G02B 6/126 |

* cited by examiner

HEAT-ASSISTED MAGNETIC RECORDING HEAD HAVING WAVEGUIDE WITH OUTER PSEUDO-SLAB THAT CONFINES STRAY LIGHT

RELATED PATENT DOCUMENTS

This application claims the benefit of Provisional Patent Application No. 62/462,478 filed on Feb. 23, 2017, which is incorporated herein by reference in its entirety.

SUMMARY

The present disclosure is directed to a waveguide with an outer pseudo-slab that confines stray light. In one embodiment, a recording head has a waveguide core having an input facet at an input surface of the recording head. The waveguide core extending to a near-field transducer at a media-facing surface of the recording head. First and second cladding regions are co-planar with and on either cross-track side of the waveguide core. First and second pseudo-slab regions are co-planar with and on outer cross-track sides of the respective first and second cladding regions. The first and second pseudo-slab regions have an index of refraction higher than that of the first and second cladding regions. The first and second pseudo-slab regions confine stray light resulting from coupling of a light source with the waveguide core at the input surface. The first and second pseudo-slab regions channel the stray light away from the near-field transducer.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
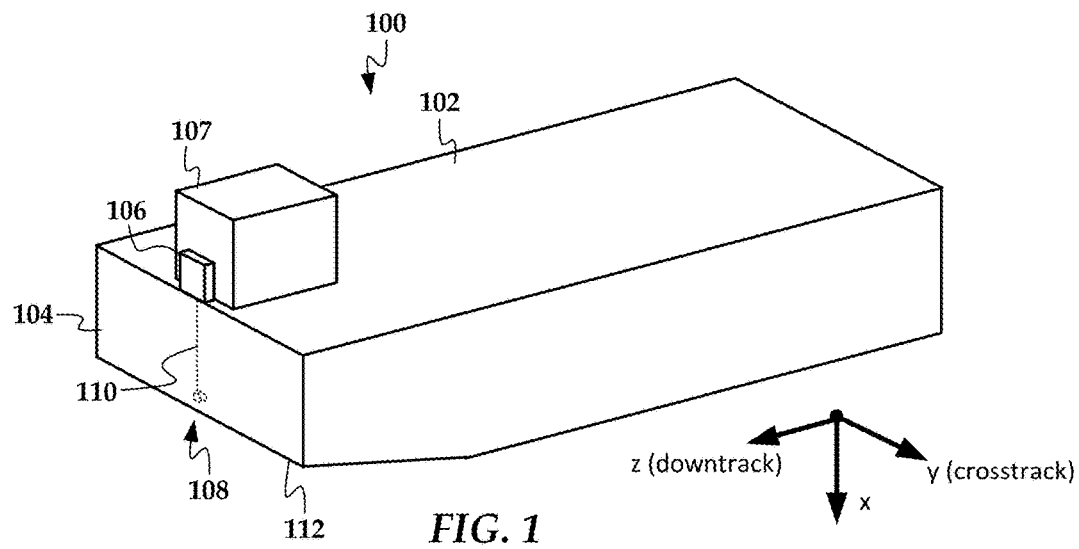
FIG. 1 is a perspective view of a slider assembly according to an example embodiment.

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into a hotspot in a recording layer. The hotspot raises the media temperature locally, reducing the writing magnetic field required for high-density recording. A waveguide delivers light to the near-field transducer and excites the near-field transducer. Light from a light source, such as an edge-emitting laser diode, is coupled into the waveguide through waveguide input coupler or a spot size converter. In current configurations, the laser diode is mounted on a magnetic slider in such a way that a transverse electric (TE) polarized light source excites a TE waveguide mode and/or transverse magnetic (TM) mode in the slider waveguide. The near-field transducer is designed to be coupled to light in one of these light delivery modes, and in response achieve surface plasmon resonance.

This disclosure describes a slider-integrated waveguide with a tapered core region surrounded on either side by a tapered cladding region. Light from a laser diode is coupled into the waveguide a coupling layer. Both the core and cladding regions taper from a relatively narrower width at the laser diode to a relatively wider width approaching the near-field transducer. The coupling layer is intended to match the beam size of the light source along the fast-axis direction for efficient coupling. The coupling layer can be a dielectric layer, for instance, $SiO_xN_y$ (silicon oxynitride), called CL1 layer, of slightly higher index of refraction than surrounding layers. Light is first coupled into the CL1 layer and then transferred to the waveguide core. Once the transfer is completed, this layer functions as a waveguide cladding for the core.

In HAMR waveguide systems a certain percentage of light emitted from the laser fails to be coupled into the waveguide core. This uncoupled light is often referred to as stray light. Stray light (sometimes referred to as scattered light) can travel in an uncontrolled manner through the head. As the stray light passes through various materials it will incur varying degrees of losses depending on the optical properties of these materials. These losses change the light energy into heat which results in uncontrolled expansion of these materials. This expansion can result in unpredictable changes in the protrusion profile of the air-bearing surface (ABS) which causes challenges in accurately controlling the close point of the head to the disk during writing and reading.

In waveguide systems described below, much of the stray light is coupled into a layer called a pseudo-slab. The pseudo-slab is formed of waveguide material. Waveguide materials are typically very low loss. As a result the amount of heat/expansion that occurs due to the stray light in the pseudo-slab layers is minimal. By controlling the separation between the pseudo-slabs and the primary waveguide, the fundamental mode profile of the waveguide system in the head can be reshaped. The ability to reshape the fundamental mode profile can allow tuning it to overlap better with the injected mode profile from the laser which results in higher coupling efficiency and lower levels of uncoupled/stray light.

In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode 106 mounted on submount 107) and a waveguide 110. The waveguide 110 delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium.

Figure 2:
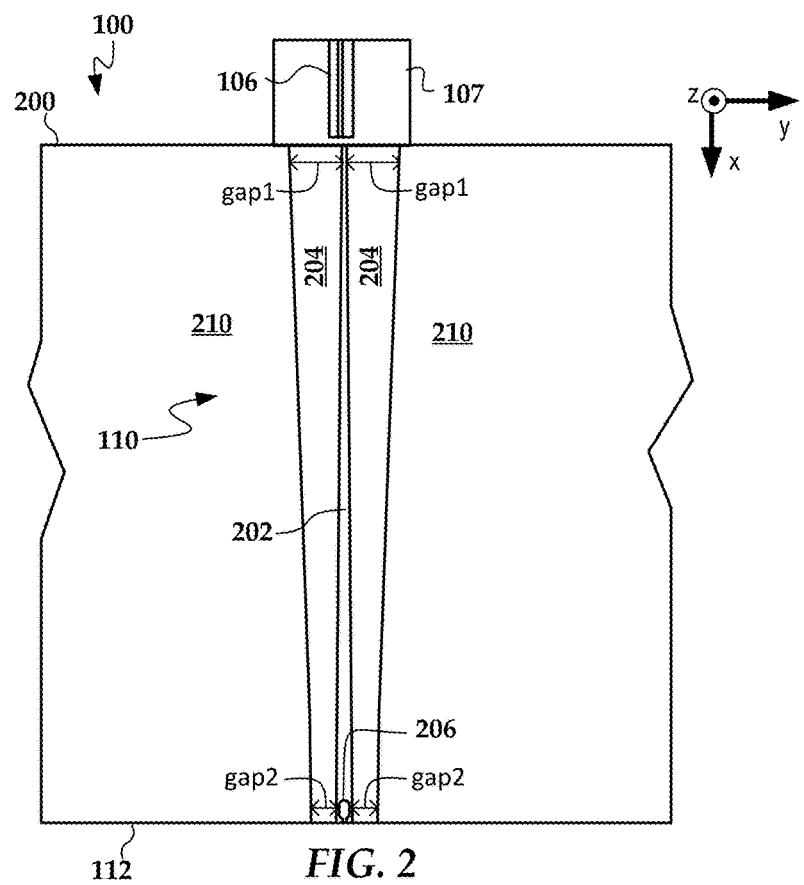
FIGS. 2-4 are cross-sectional views of a waveguide system according to example embodiments.

In FIG. 2, a view of a slider trailing edge shows a configuration of the waveguide 110 according to an example embodiment. Other details of this light delivery configuration are shown in the cross-sectional views of FIGS. 3 and 4. As seen in FIG. 2, a transverse electric (TE) polarized laser source 106, for instance, an edge-emitting laser diode mounted on a submount 107, launches light into a top surface 200 of the read/write head 100. This concept may also work with transverse magnetic (TM) light sources. The light source 106 excites a fundamental, transverse ($TE_{00}$) mode propagating along a core 202. The core 202 is formed of a high-index material and is surrounded by two tapered side cladding regions 204. The side cladding regions 204 taper from a wider to narrower cross-track width from the top surface 200 to the media-facing surface 112. The core 202 tapers from narrower to wider crosstrack width from the top surface 200 to the media-facing surface 112. A near-field transducer (NFT) 206 is located at the media-facing surface 112.

Figure 3:
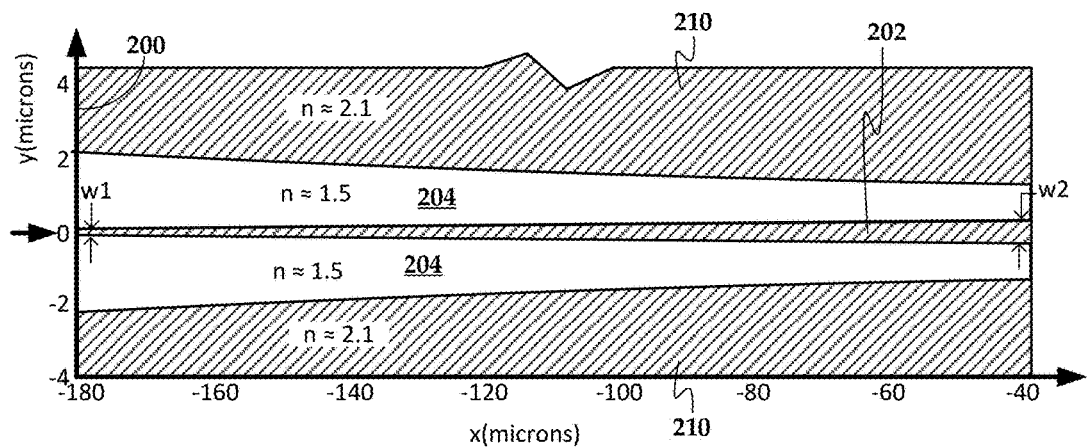

The cladding regions 204 are surrounded on outer cross-track sides by high-index regions 210 referred to herein as a pseudo-slab. The pseudo slab extends for at least 10 μm in the y-direction on either side of the cladding regions 204, or at least 12 times the wavelength of the light (wavelength is assumed to be 830 nm in this example). As seen in FIG. 3, the pseudo-slab 210 can have a refractive index n near to or the same as the core 202 (n=2.1 in this example). A major portion (>60%) of the stray light can be coupled in the pseudo-slab 210. The pseudo-slab 210 can couple/channel stray light to a region far away from NFT 206. Because stray light is confined in the slab layer where losses are lowest, there is reduced scattering/heating which should help reduce laser-induced protrusion (LIP) at or near the media-facing surface 112.

Figure 4:
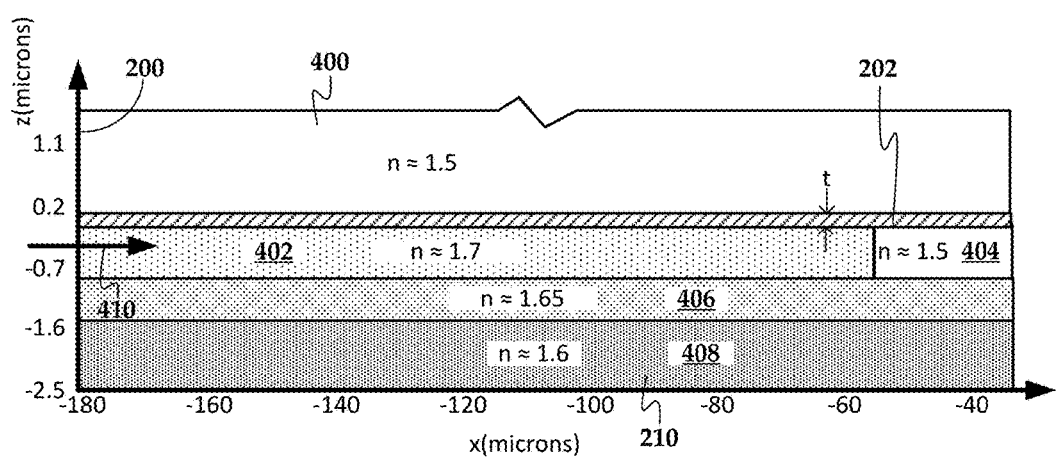

As seen in FIG. 4, a top cladding layer 400 is on top of the core 202, and also extends in the y-direction to cover the cladding regions 204 and pseudo-slab 210. The pseudo-slab 210 may have a thickness that is the same or greater than thickness t of the core 202. A CL1 coupling layer 402 is underneath the core 202, extending away from the input surface 200 in the light propagation direction (x-direction) to where it transitions to a lower index material 404 (CL7). The CL1 and CL7 materials 402, 404 are deposited in a bottom cladding layer 406 (e.g., $AlO_x$) which sits atop a non-optical under-layer 408.

In this arrangement, it is found that the pseudo-slab 210 enhances coupling efficiency. For example, in this configuration, the coupling efficiency is estimated to be approximately 83% compare to 76% for an equivalent system that does not use the pseudo-slab 210. In FIGS. 5-9, graphs show additional analysis results which demonstrate the effect of cross-track misalignment of the light source with the waveguide core using a pseudo-slab arrangement.

Figure 5:
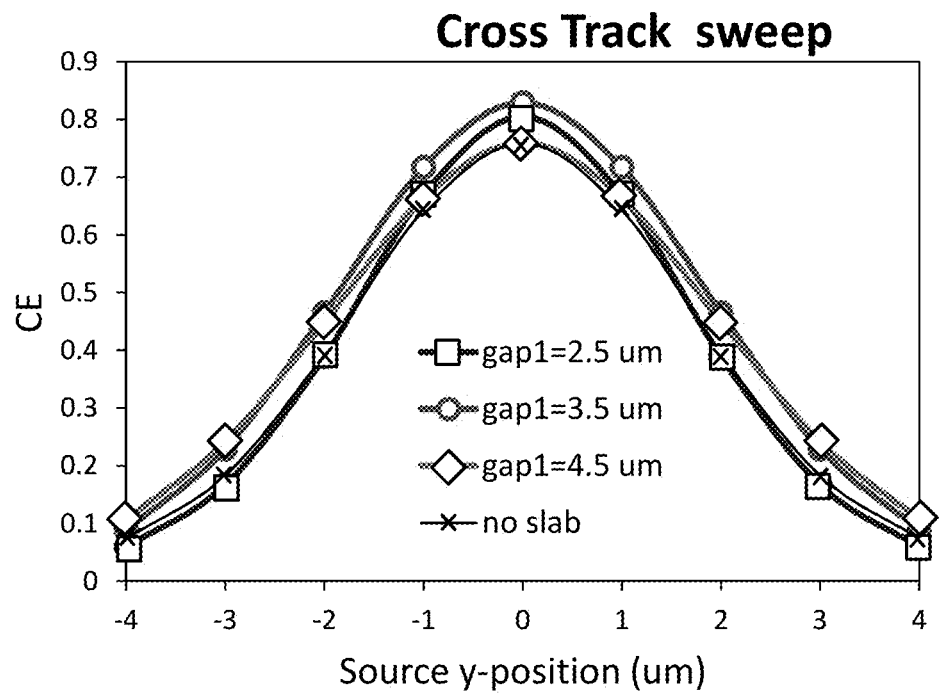
FIGS. 5-10 are graphs showing effects of changing cross-track laser alignment in a model of a waveguide system as shown in FIGS. 2-4.
Figure 6:
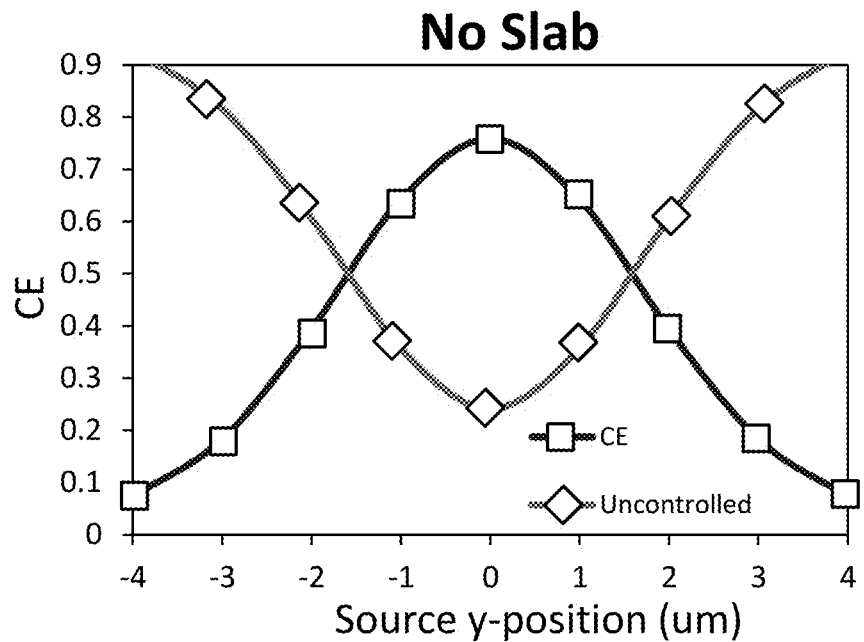
Figure 7:
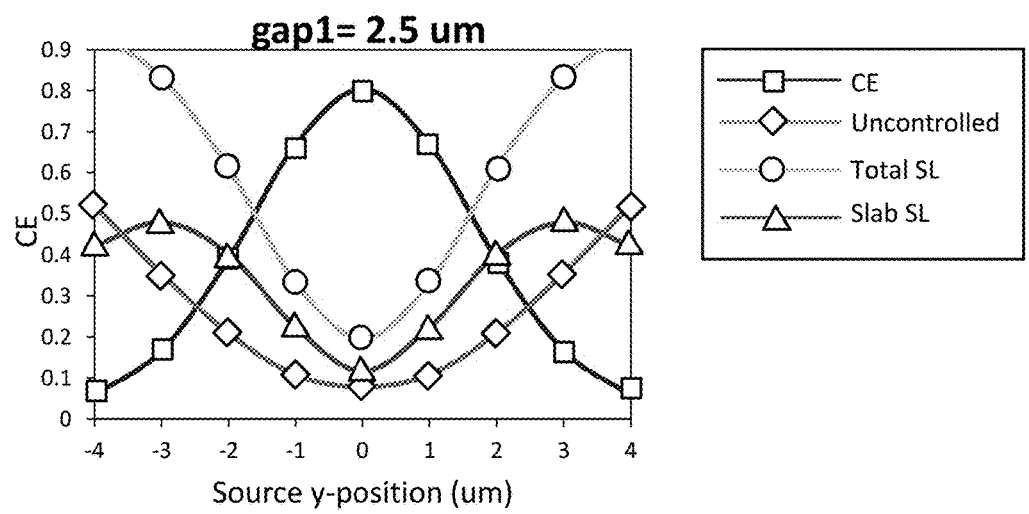
Figure 8:
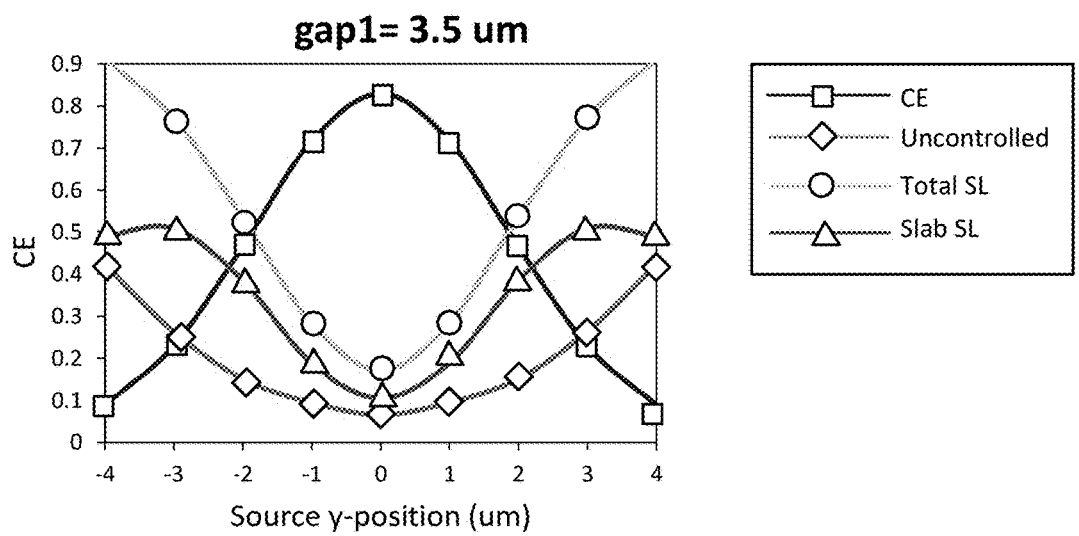
Figure 9:
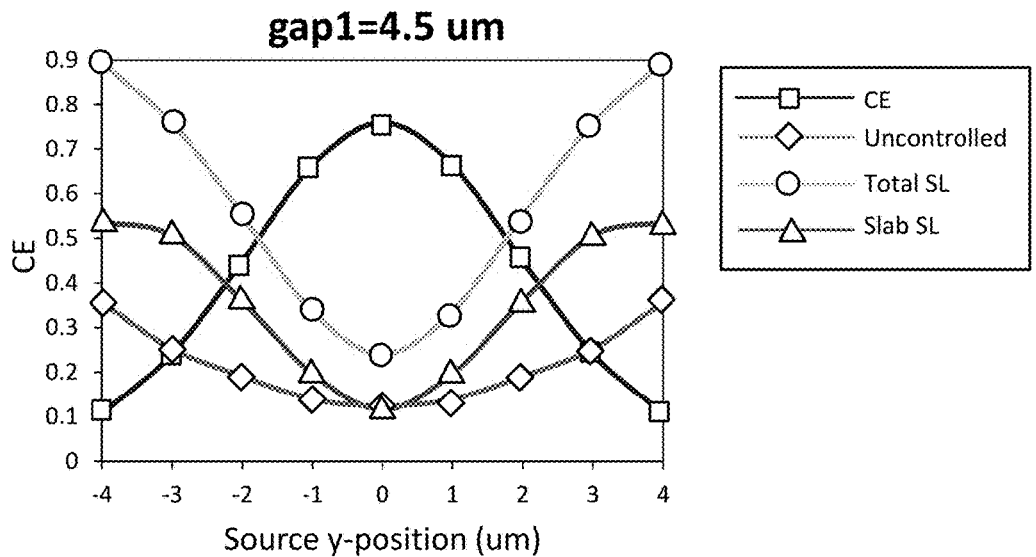

For the analysis results in FIGS. 5-9, the waveguide dimensions were set as follows: core beginning and ending widths w1=0.16 μm and w2=0.65 μm (see FIG. 3); core thickness t=0.17 μm (see FIG. 4; pseudo-slab thickness also 0.17 μm); CL1 length in the x-direction=123 μm; gap2=0.75 μm (see FIG. 2); and z-location of the light source=−0.6 μm (see arrow 410 in FIG. 4). In FIG. 5, coupling efficiency (CE) for three different gap1 values are shown as a function of cross-track offset of the light source, and compared to results without a pseudo-slab. In FIGS. 6-9, graphs show additional values of uncontrolled light for the four different cases. Uncontrolled light is stray light that is not contained in the slab. Where no pseudo-slab is used, all stray light is assumed to be uncontrolled light. The graphs in FIGS. 7-9 also show slab stray light (SL) and total SL for a pseudo-slab embodiment with the three different gap1 values.

Figure 10:
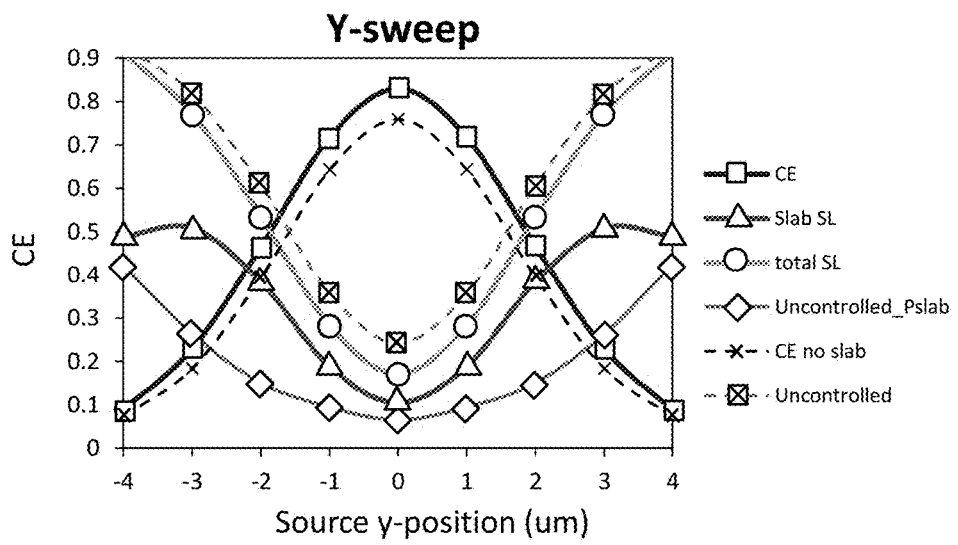
Figure 11:
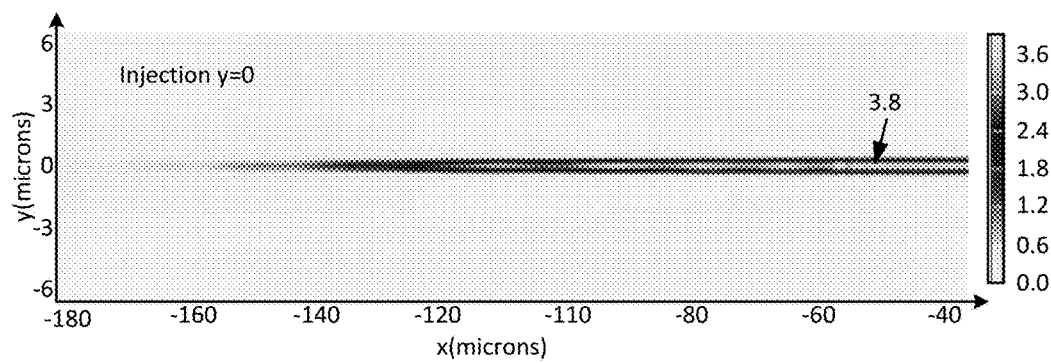
FIGS. 11-12 are electrical field contour plots showing effects of changing cross-track laser alignment in a model of a waveguide system as shown in FIGS. 2-4.
Figure 12:
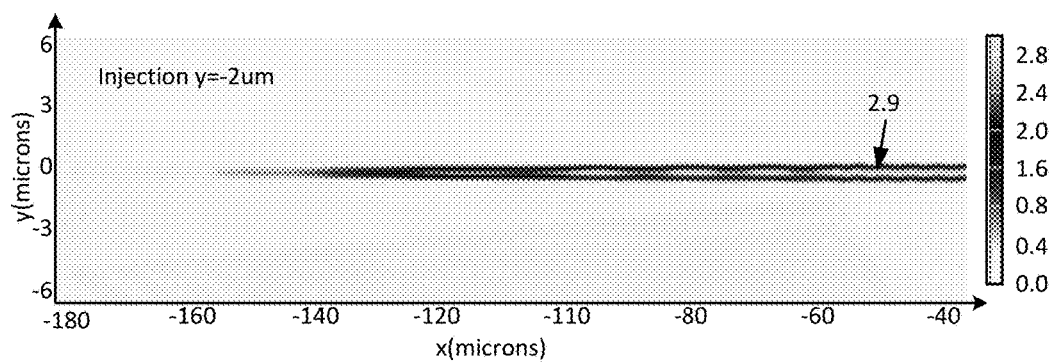
Figure 13:
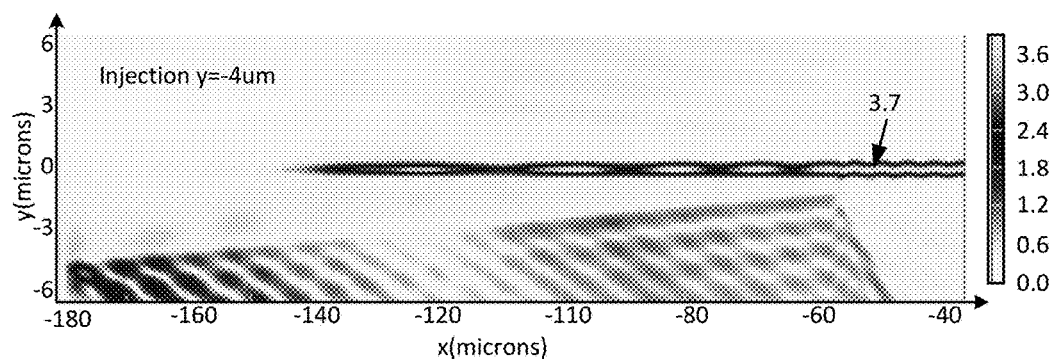
FIGS. 13-18 are graphs showing effects of changing down-track laser alignment in a model of a waveguide system as shown in FIGS. 2-4.

The case with gap1=3.5 μm demonstrates the overall highest coupling efficiency between perfect alignment (y=0) and maximum misalignment (y=±4 μm). In FIG. 10, a graph shows the gap1=3.5 μm case compared to a similar configuration with no pseudo-slab. In FIGS. 11-13, two-dimensional contour plots show the electrical field strength for three values of cross-track offset using this gap1=3.5 μm configuration.

Figure 14:
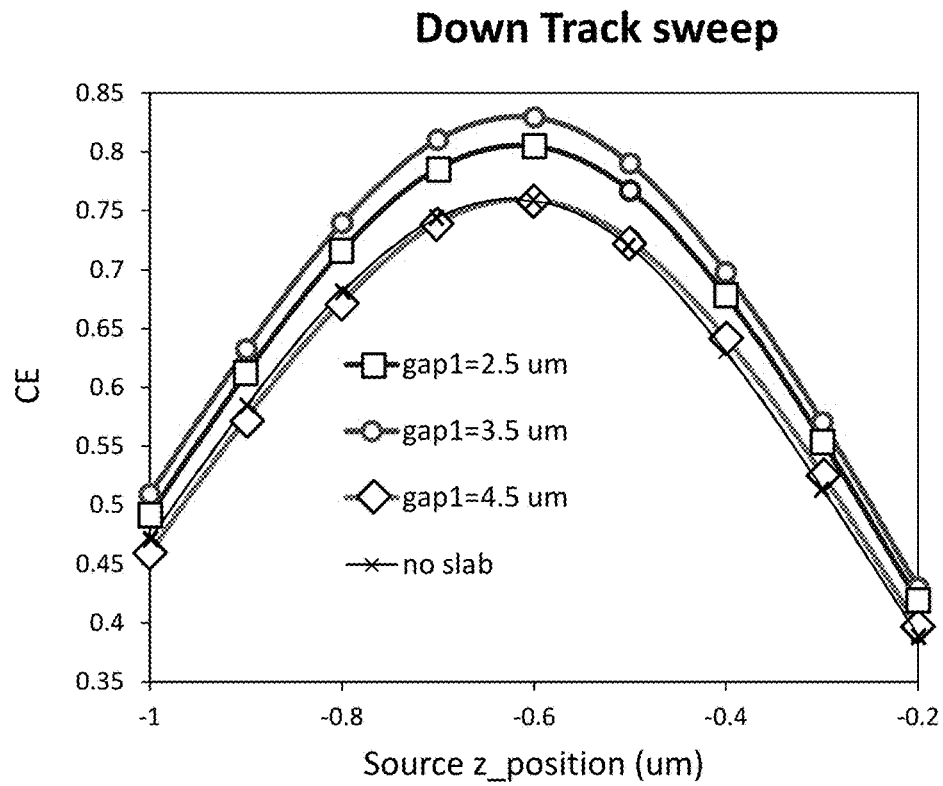
Figure 15:
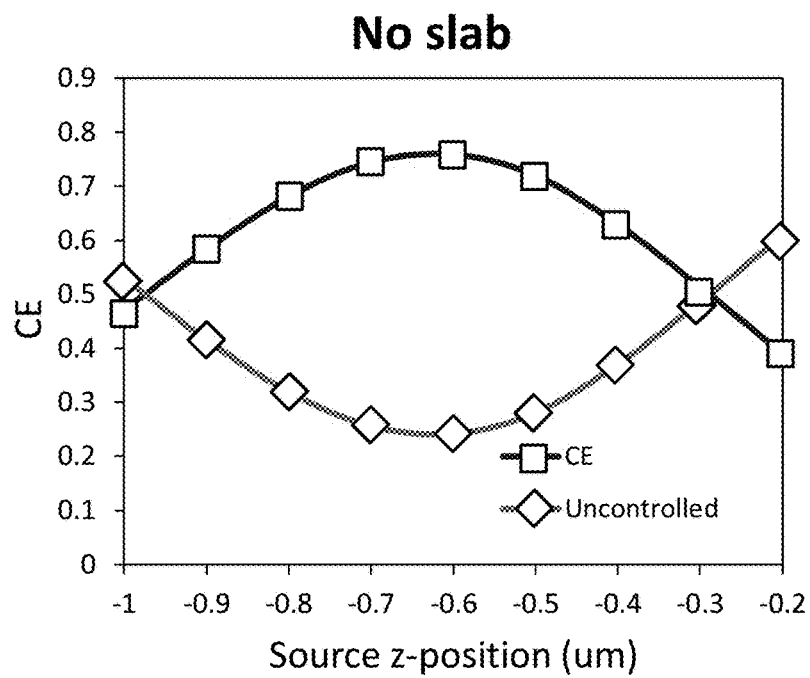
Figure 16:
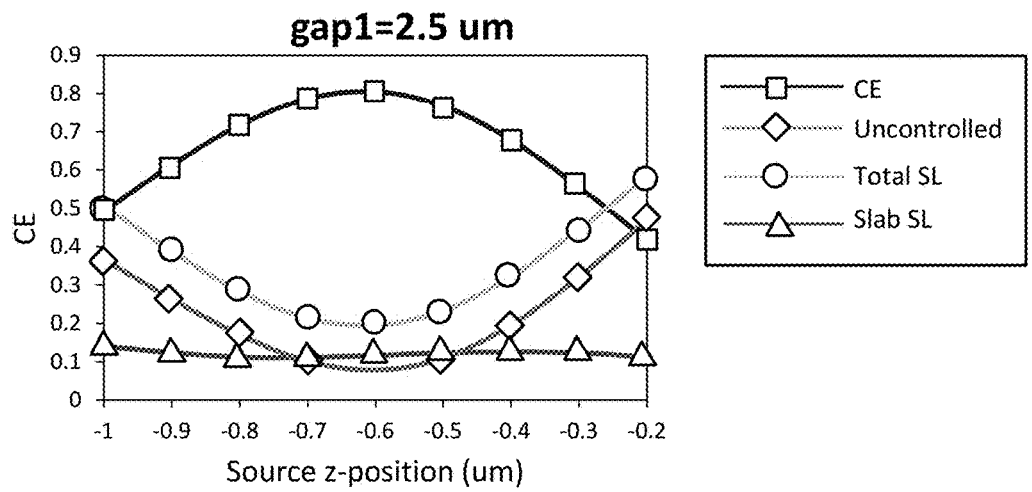
Figure 17:
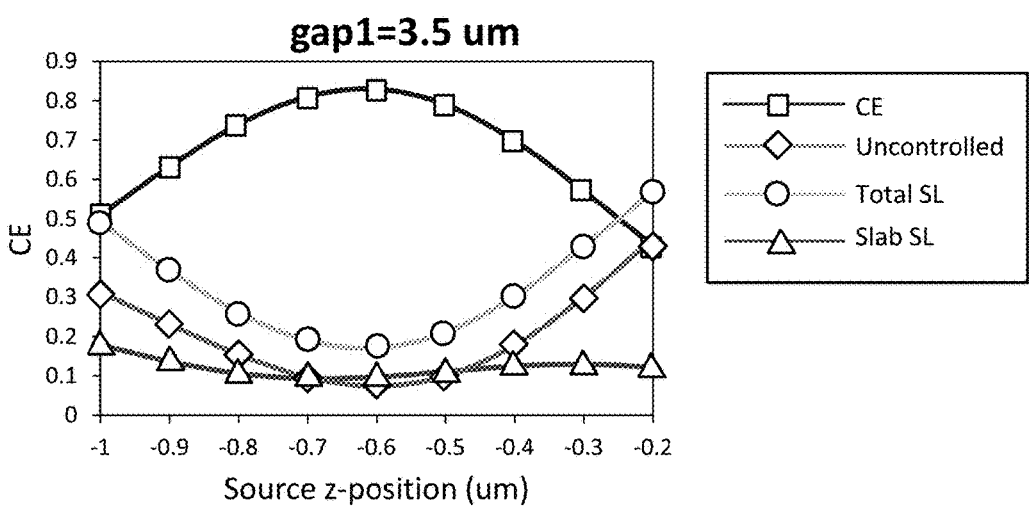
Figure 18:
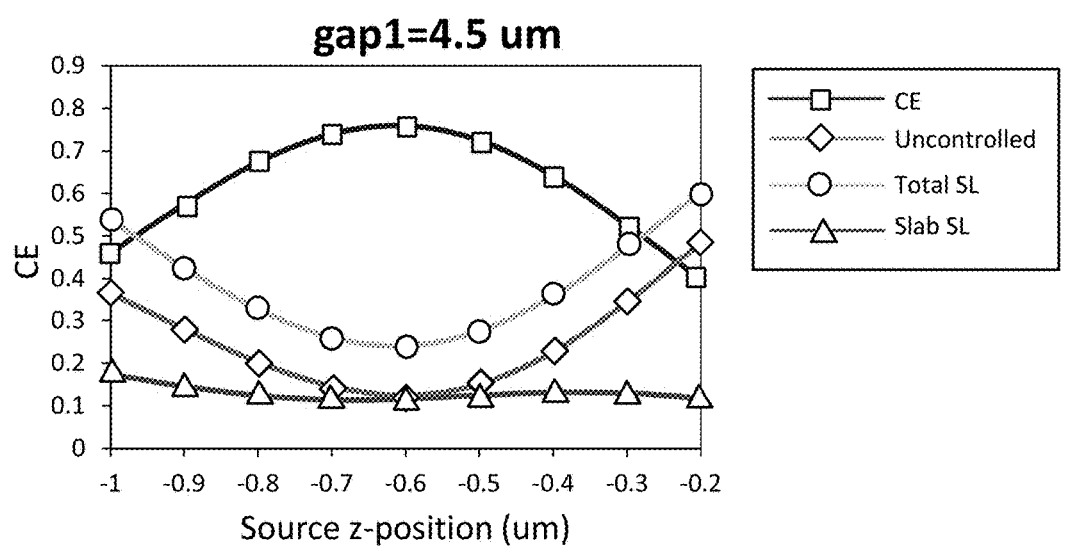

In FIGS. 14-18, graphs show analysis results which demonstrate the effect of down-track misalignment of the light source with the waveguide core using a pseudo-slab. For the analysis results in FIGS. 14-18, the waveguide dimensions were the same as for the analysis in FIGS. 5-10, with the light source aligned at y=0 and x=0. Note that for highest coupling efficiency, the laser light is down-track centered in the coupling layer 402, at z=−0.6 μm (see FIG. 4). In FIG. 14, CE for three different gap1 values are shown as a function of down-track offset of the light source, and compared to results without a pseudo-slab. In FIGS. 15-18, graphs show values of uncontrolled light for the four different cases, and FIGS. 16-18 also show slab stray light and total stray light for a pseudo-slab embodiment with the three different gap1 values.

Figure 19:
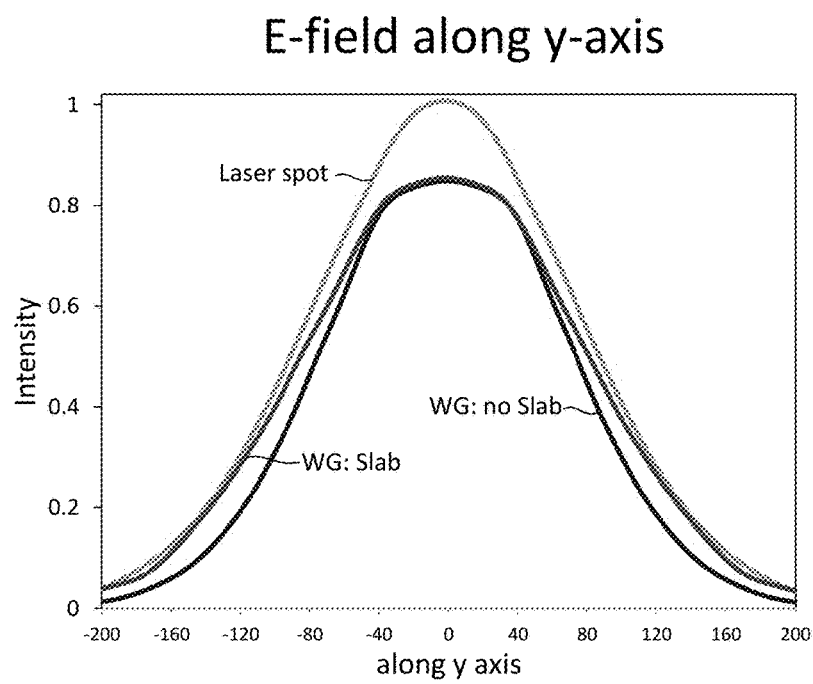
FIGS. 19 and 20 are graphs showing amplitude and electrical field for a waveguide system as shown in FIGS. 2-4.
Figure 20:
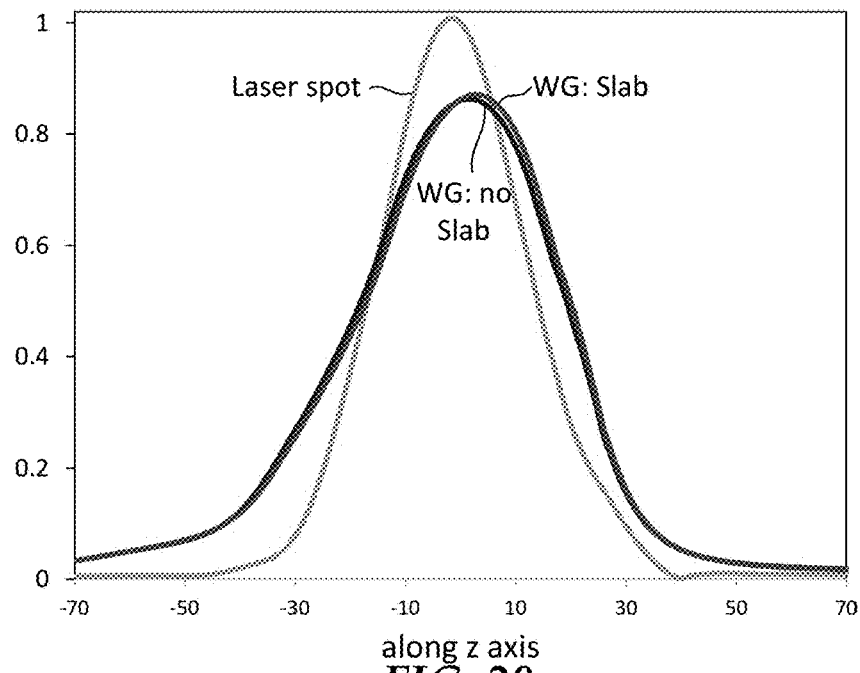

In FIGS. 19 and 20, graphs show E-field intensity along y-axis and z-axis for configurations with and without a pseudo-slab. The pseudo-slab enhances cross-track e-field overlapping with the input laser spot, resulting in increased field away from the cross-track centerline. This increase in field intensity results in the aforementioned 7% increase in CE.

Figure 21:
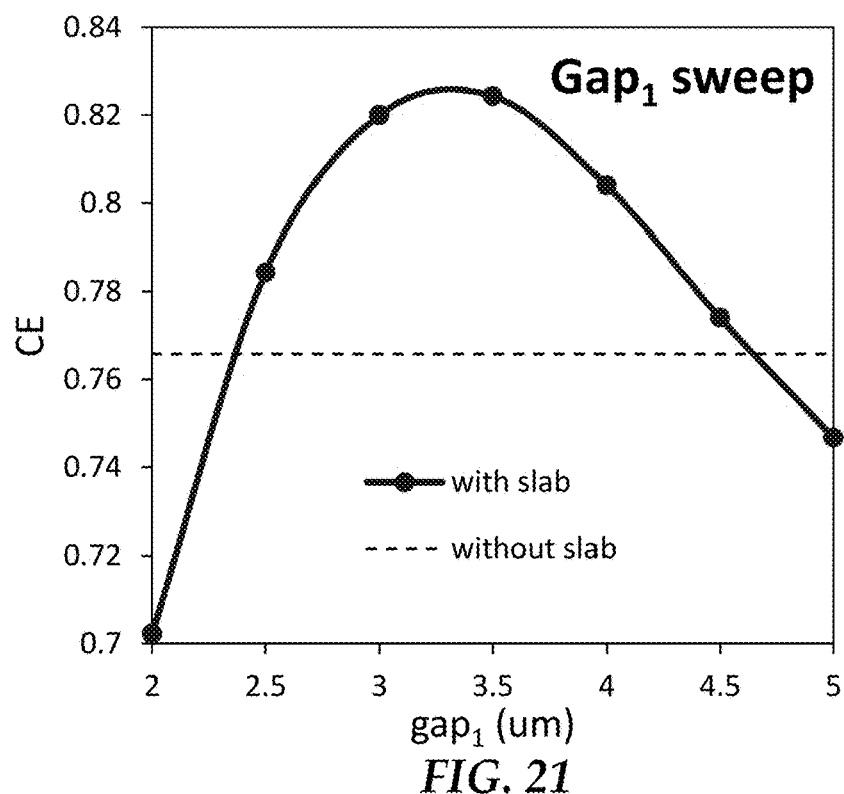
FIG. 21 is a graph showing the effect of gap dimension on coupling efficiency for a waveguide system as shown in FIGS. 2-4.
Figure 22:
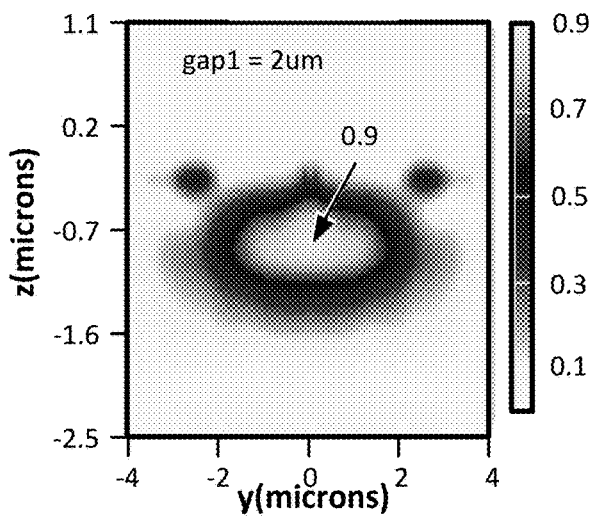
FIGS. 22-24 are electrical field contour plots showing results of changing gap dimension in a model of a waveguide system as shown in FIGS. 2-4.
Figure 23:
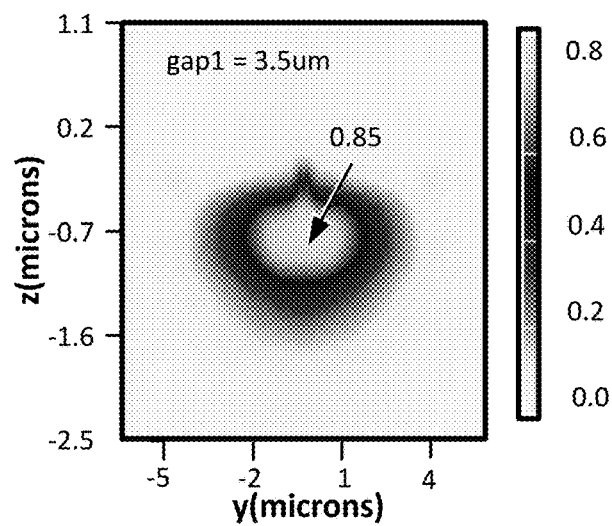
Figure 24:
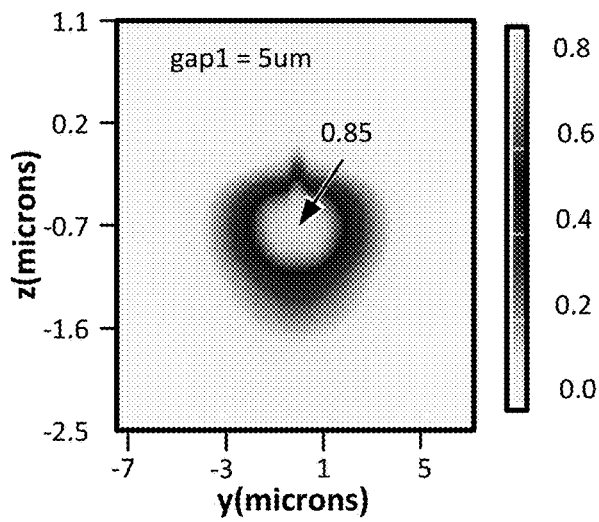
Figure 25:
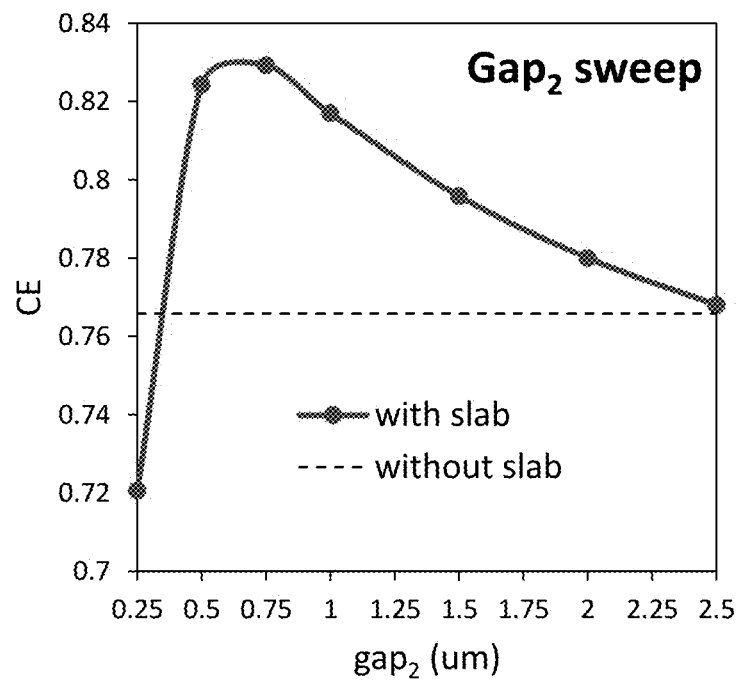
FIGS. 25 and 26 are graphs showing results of changing gap dimension on coupling efficiency and intensity in a model of a waveguide system as shown in FIGS. 2-4.
Figure 26:
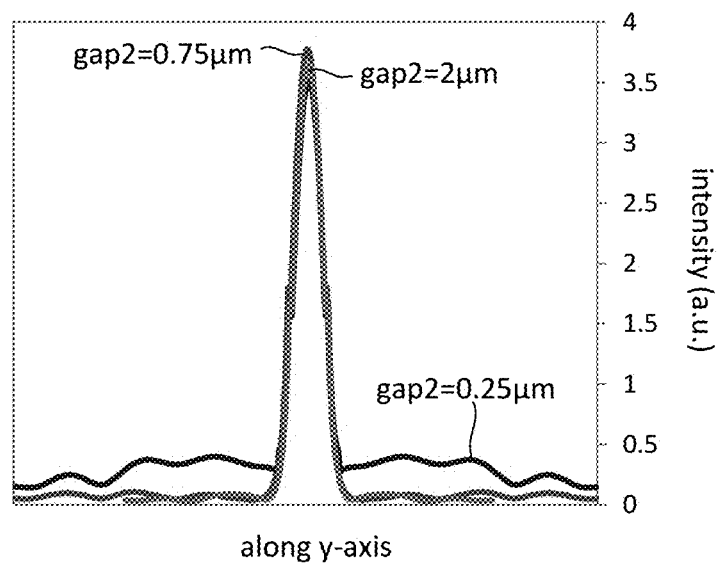
Figure 27:
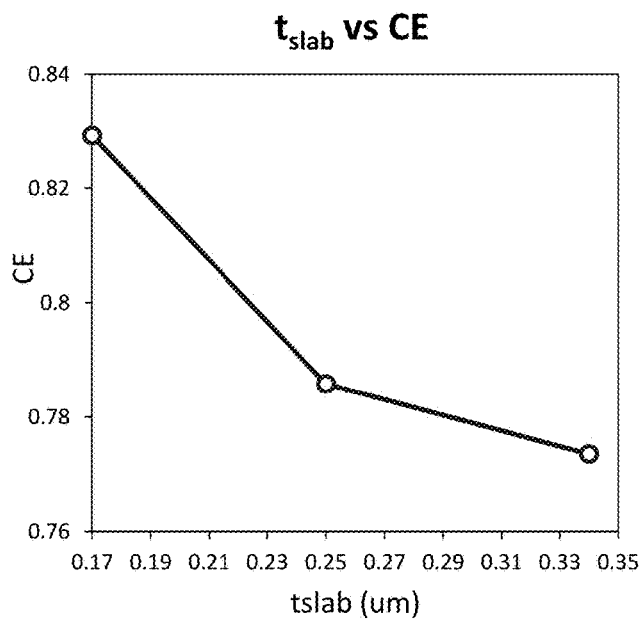
FIG. 27 is a graph showing the effect of pseudo-slab thickness on coupling efficiency for a waveguide system as shown in FIGS. 2-4.

In FIG. 21, a graph shows CE for various gap1 values using the same waveguide dimensions as for the analysis in FIGS. 5-10. The maximum CE is at about gap1=3.5 µm. In FIGS. 22-24, contour plots show the E-field magnitude on the yz-plane for three different values of gap1. In FIG. 25, a graph shows CE for various gap2 values using the same waveguide dimensions as for the analysis in FIGS. 5-10. The maximum CE is at about gap2=0.75 µm. In FIG. 26, a plot shows cross-track amplitude of light for three different gap2 values. The amplitude shown in FIG. 26 is through a section of the waveguide core approximately 15 microns from the media-facing surface and parallel to the media-facing surface. In FIG. 27, a graph shows how pseudo-slab thickness (z-direction dimension) affects CE. Note that for all of the cases shown in FIG. 27, the thickness of the core is the same, around 0.17 µm.

In the previous example, the light is coupled into the waveguide in a $TE_{00}$ mode and propagates into the mode through the waveguide and is coupled into the NFT in the $TE_{00}$ mode. In some cases, an NFT is instead configured to utilize a fundamental transverse magnetic mode ($TM_{00}$). In other cases, the NFT may use a higher-order TE mode (e.g., $TE_{10}$). In cases where the light source emits a different mode than what used by the NFT, a mode converter may be placed in the light to change the mode before it is coupled to the NFT. The pseudo-slab can be used to enhance coupling efficiency and control stray light in waveguides with a mode converter as well.

Figure 28:
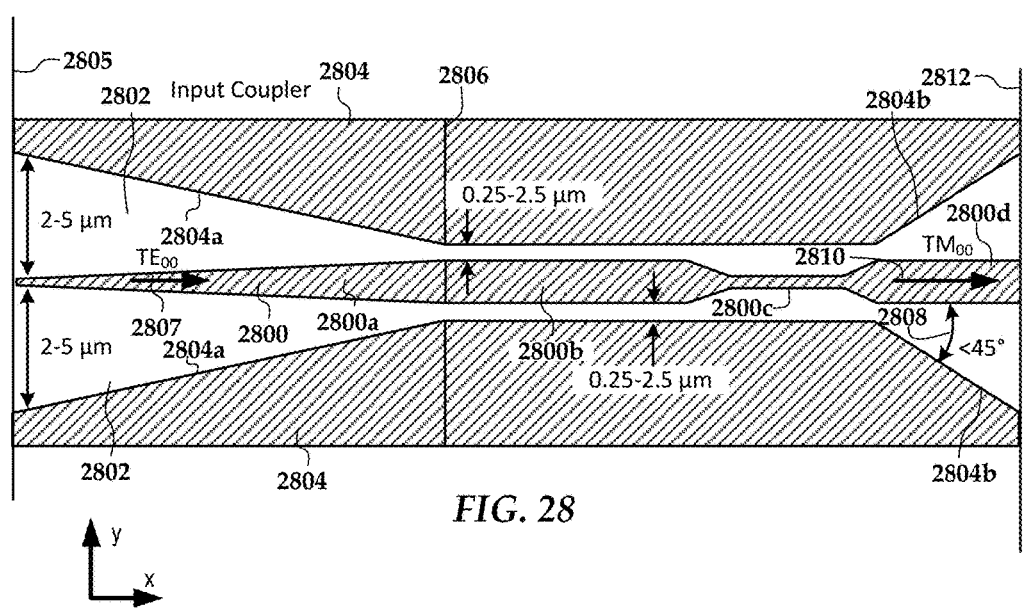
FIG. 28 is a cross-sectional view of a waveguide system according to another example embodiment.

In FIG. 28, a diagram shows a mode-converter waveguide with a pseudo-slab according to an example embodiment. The waveguide includes a core 2800 surrounded on either cross-track side by cladding portions 2802 of a lower index. Pseudo-slabs 2804 of a higher index surround outer cross-track sides of the cladding portions 2802. The core 2800 has a first taper 2800a that extends from the input surface 2805 to a step 2806. The region of the waveguide between the step 2806 and the input surface 2805 corresponds to an input coupling region, where light 2807 is coupled in a $TE_{00}$ mode. An input coupler layer (e.g., similar to layer 402 in FIG. 4) can be used in the input coupling region. The cladding portions 3802 taper in the coupling region, from wider-to-narrow cross-track width as opposed to the narrower-to-wider tapering of the core's first taper 2800a. Sides 2804a of the pseudo-slabs 2804 have tapers that correspond to this tapering of the cladding portion 2802.

Away from the input coupling region, the core 2008 includes a first straight portion 2800b, a necked/narrowed portion 2800c, and a second straight portion 2800d. The geometry of these portions 2800b-d is selected so as to convert the light to a $TM_{00}$ mode 2810, where it is coupled to an NFT (not shown) and directed out a media-facing surface 2812. Note that sides 2804b of the pseudo-slabs 2804 taper to a wider dimension as the sides approach the media-facing surface 2812, as do corresponding edges of the cladding portions 2802. This taper is at an angle 2808 that is less than 45 degrees.

Figure 29:
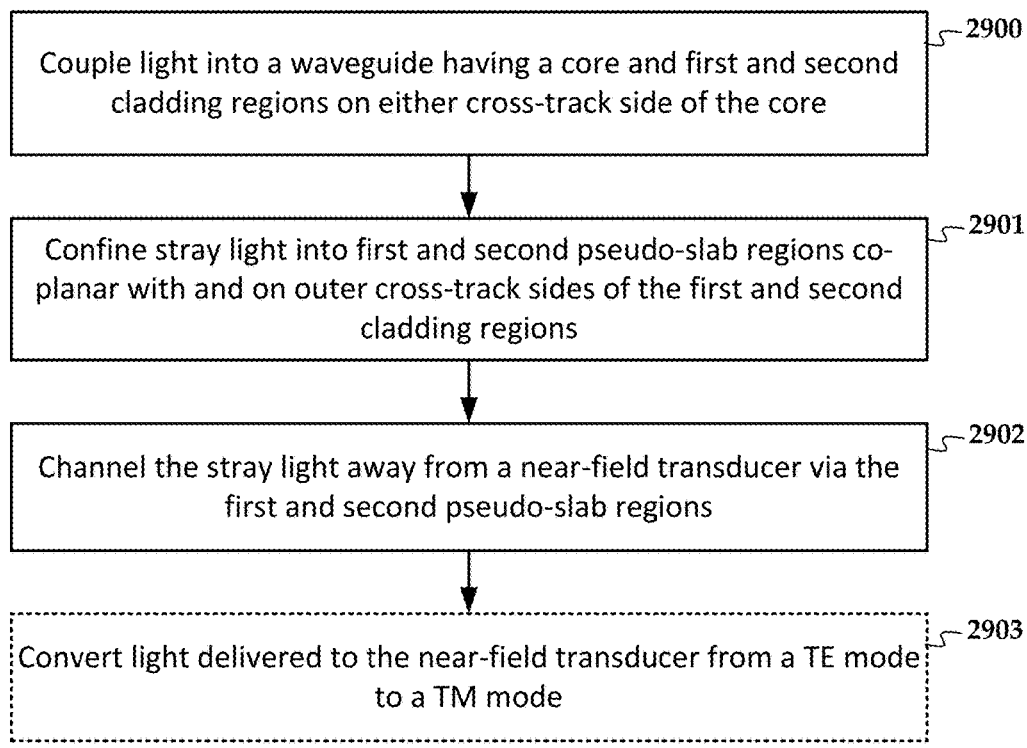
FIG. 29 is a flowchart of a method according to an example embodiment.

In FIG. 29, a flowchart shows a method according to an example embodiment. The method involves coupling 2900 light from a light source into a waveguide having a first end at an input surface of a recording head. The waveguide has a core and first and second cladding regions co-planar with and on either cross-track side of the core. The core and cladding regions extend to a near-field transducer at a media-facing surface of the recording head.

Stray light resulting from the coupling is confined 2901 into first and second pseudo-slab regions co-planar with and on outer cross-track sides of the respective first and second cladding regions. The first and second pseudo-slab regions have an index of refraction higher than that of the first and second cladding regions. The stray light away is channeled 2902 from the near-field transducer via the first and second pseudo-slab regions. Optionally, the light is converted 2903 from a transverse electric mode to a transverse magnetic mode, e.g., via a necked portion of the core between two straight portions of the core.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
   a waveguide core having an input facet at an input surface of the recording head, the waveguide core extending to a near-field transducer at a media-facing surface of the recording head;
   first and second cladding regions on a layer co-planar with the waveguide core and on either cross-track side of the waveguide core; and
   first and second pseudo-slab regions on the layer co-planar with the waveguide core and on outer cross-track sides of the respective first and second cladding regions, the first and second pseudo-slab regions having an index of refraction higher than that of the first and second cladding regions, the first and second pseudo-slab regions confining stray light that fails to be coupled from a light source into the waveguide core at the input surface, the first and second pseudo-slab regions channeling the stray light away from the near-field transducer.

2. The recording head of claim 1, wherein the first and second cladding regions are tapered from a wider cross-track dimension at the input surface to a narrower cross-track dimension at the media-facing surface.

3. The recording head of claim 1, further comprising a coupling layer on an under-layer below the waveguide core, the coupling layer overlapping the first and second cladding regions and the first and second pseudo-slab regions, the coupling layer terminated between the input surface and the media-facing surface.

4. The recording head of claim 3, wherein the light source is aligned to couple light into a downtrack center of the coupling layer at the input surface, the coupling layer coupling the light into the core away from the input surface.

5. The recording head of claim 1, where the index of refraction of the pseudo-slab regions is the same as that of the waveguide core.

6. The recording head of claim 1, wherein the waveguide core has a necked portion between two straight portions, the necked portion and straight portions converting light from a transverse electric mode to a transverse magnetic mode.

7. The recording head of claim 1, wherein the first and second pseudo-slab regions extend in first and second cross-track directions at least 10 µm from the first and second cladding regions.

8. A method comprising:
coupling light from a light source into a waveguide having a first end at an input surface of a recording head, the waveguide comprising a core and first and second cladding regions on a layer co-planar with the core and on either cross-track side of the core, the core and cladding regions extending to a near-field transducer at a media-facing surface of the recording head;
confining stray light that fails to be coupled from the light source into the waveguide into first and second pseudo-slab regions on the layer co-planar with the core and on outer cross-track sides of the respective first and second cladding regions, the first and second pseudo-slab regions having an index of refraction higher than that of the first and second cladding regions; and
channeling the stray light away from the near-field transducer via the first and second pseudo-slab regions.

9. The method of claim 8, wherein the first and second cladding regions are tapered from a wider cross-track dimension at the input surface to a narrower cross-track dimension at the media-facing surface.

10. The method of claim 8, wherein a coupling layer on an under-layer below the core assists in the coupling of the light into the waveguide, the coupling layer overlapping the first and second cladding regions and the first and second pseudo-slab regions, the coupling layer terminated between the input surface and the media-facing surface.

11. The method of claim 8, where the index of refraction of the pseudo-slab regions is the same as that of the core.

12. The method of claim 8, wherein the core has a necked portion between two straight portions, the method further comprising converting light from a transverse electric mode to a transverse magnetic mode via the necked portion and straight portions.

13. The method of claim 8, wherein the first and second pseudo-slab regions extend in first and second cross-track directions at least 10 µm from the first and second cladding regions.

14. A recording head comprising:
a near-field transducer at a media-facing surface of the recording head;
a waveguide that receives light from a light source at an input surface of the recording head and delivers the light to the near-field transducer of the recording head, the waveguide comprising:
a core that tapers from a first width at the input at the input surface to a second width away from the input surface, the first width being greater than the second width;
first and second cladding regions on a layer co-planar with the core and on either cross-track side of the waveguide core; and
first and second pseudo-slab regions on the layer co-planar with the core and on outer cross-track sides of the respective first and second cladding regions, the first and second pseudo-slab regions having an index of refraction higher than that of the first and second cladding regions, the first and second pseudo-slab regions confining stray light away from the near-field transducer, the stray light having failed to be coupled from the light source to the core at the input surface.

15. The recording head of claim 14, wherein the first and second cladding regions are tapered from a wider cross-track dimension at the input surface to a narrower cross-track dimension at the media-facing surface.

16. The recording head of claim 14, further comprising a coupling layer on an under-layer below the core, the coupling layer overlapping the first and second cladding regions and the first and second pseudo-slab regions, the coupling layer terminated between the input surface and the media-facing surface.

17. The recording head of claim 14, where the second width of the core is at an end of a coupling region of the waveguide, the core further comprising a mode converter between the coupling region and the media-facing surface, the mode converter converting light from a transverse electric mode to a transverse magnetic mode.

18. The recording head of claim 15, wherein the waveguide further comprises mode converter, the mode converter comprising a necked portion of the core between two straight portions of the core.

19. The recording head of claim 14, wherein the second width of the core is proximate the media-facing surface.

20. The recording head of claim 14, wherein the first and second pseudo-slab regions extend in first and second cross-track directions from the first and second cladding regions a distance that is at least 12 times a wavelength of the light.

* * * * *